United States Patent
Taniguchi et al.

(10) Patent No.: US 10,611,921 B2
(45) Date of Patent: *Apr. 7, 2020

(54) WATER-BASED INK FOR INK-JET RECORDING AND INK CONTAINER

(71) Applicant: Brother Kogyo Kabushiki Kaisha, Nagoya-shi, Aichi-ken (JP)

(72) Inventors: Akihiko Taniguchi, Kakamigahara (JP); Satoshi Okuda, Inazawa (JP); Yuka Tsuzaka, Nagoya (JP); Mitsunori Maeda, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 131 days.

This patent is subject to a terminal disclaimer.

(21) Appl. No.: 15/882,402

(22) Filed: Jan. 29, 2018

(65) Prior Publication Data

US 2018/0282561 A1  Oct. 4, 2018

(30) Foreign Application Priority Data

Mar. 31, 2017 (JP) ................. 2017-071134

(51) Int. Cl.
*C09D 11/322* (2014.01)
*C09D 11/324* (2014.01)
*C09D 11/326* (2014.01)
*C09D 11/037* (2014.01)
*C09D 11/108* (2014.01)
*C09D 11/107* (2014.01)
C08K 3/04 (2006.01)
C08K 5/3465 (2006.01)
C08K 5/00 (2006.01)

(52) U.S. Cl.
CPC .......... *C09D 11/322* (2013.01); *C09D 11/037* (2013.01); *C09D 11/107* (2013.01); *C09D 11/108* (2013.01); *C09D 11/324* (2013.01); *C09D 11/326* (2013.01); C08K 3/04 (2013.01); C08K 5/0091 (2013.01); C08K 5/3465 (2013.01); C08K 2201/003 (2013.01)

(58) Field of Classification Search
CPC ... C09D 11/322; C09D 11/037; C09D 11/107; C09D 11/108; C09D 11/324; C09D 11/326

USPC .......................................................... 524/88
See application file for complete search history.

(56) References Cited

U.S. PATENT DOCUMENTS

| | | | |
|---|---|---|---|
| 5,609,671 A | 3/1997 | Nagasawa | |
| 5,837,045 A | 11/1998 | Johnson et al. | |
| 6,387,168 B1 | 5/2002 | Koitabashi et al. | |
| 8,016,404 B2 | 9/2011 | Kato et al. | |
| 2001/0035110 A1 | 11/2001 | Kato | |
| 2006/0089421 A1* | 4/2006 | Vasudevan | C09B 68/20 523/160 |
| 2006/0089422 A1* | 4/2006 | Vasudevan | C09B 68/20 523/160 |
| 2006/0201380 A1 | 9/2006 | Kowalski et al. | |
| 2007/0100023 A1 | 5/2007 | Burns et al. | |
| 2007/0100024 A1 | 5/2007 | Gu et al. | |
| 2008/0241398 A1 | 10/2008 | Kato et al. | |
| 2009/0229489 A1 | 9/2009 | Gu | |
| 2017/0100024 A1 | 4/2017 | Shahmoon et al. | |

FOREIGN PATENT DOCUMENTS

| | | | |
|---|---|---|---|
| JP | H08-003498 A | | 1/1996 |
| JP | 2000-239589 A | | 9/2000 |
| JP | 2000-513396 A | | 10/2000 |
| JP | 2001-254039 A | | 9/2001 |
| JP | 2006-176756 A | | 7/2006 |
| JP | 2008-524400 A | | 7/2008 |
| JP | 2008-246821 A | | 10/2008 |
| JP | 2009-515007 A | | 4/2009 |
| JP | 2011-515535 A | | 5/2011 |
| JP | 2015067717 A | * | 4/2015 |

* cited by examiner

*Primary Examiner* — Kelechi C Egwim
(74) *Attorney, Agent, or Firm* — Banner & Witcoff, Ltd.

(57) ABSTRACT

There is provided a water-based ink for ink-jet recording including: water; a self-dispersible black pigment; and a resin-dispersed pigment of which hue angle is in a range of 180° to 270° and of which sedimentation velocity in the water-based ink is slower than sedimentation velocity of the self-dispersible black pigment in the water-based ink. A ratio (R/S) of a solid content weight (R) of the resin-dispersed pigment to a solid content weight (S) of the self-dispersible black pigment in the water-based ink is in a range of 0.26 to 0.80.

16 Claims, 2 Drawing Sheets

WATER-BASED INK FOR INK-JET RECORDING AND INK CONTAINER

CROSS REFERENCE TO RELATED APPLICATION

The present application claims priority from Japanese Patent Application No. 2017-071134 filed on Mar. 31, 2017 the disclosure of which is incorporated herein by reference in its entirety.

BACKGROUND

Field of the Invention

The present invention relates to a water-based ink for ink-jet recording, and an ink container which accommodates the water-based ink for ink-jet recording therein.

Description of the Related Art

In a water-based ink for ink-jet recording (hereinafter referred to also as a "water-based ink" or an "ink" in some cases), a pigment is widely used as a colorant. In the water-based ink using the pigment, however, the particles of the pigment often sediment (settle) as time passes. The sedimentation of the pigment particles causes a problem(s) such as the increase in the viscosity of the water-based ink in the vicinity of nozzles of an ink-jet head, any unsatisfactory jetting (discharge), any non-uniform density in the water-based ink, etc.

As a solution to the above-described problem(s), there is proposed a self-dispersible dye-pigment containing a pigment, a polymer covalently bonded to the pigment, a dye bonded to the polymer, and a dispersant covalently bonded to at least one of the pigment, the polymer and the dye (see, for example, Japanese Patent Application Laid-open No. 2006-176756 corresponding to U.S. Patent Application Publication Nos. US2006/0089421 and US2006/0089422).

In the above-described self-dispersible dye-pigment, however, it is necessary to use the different kinds of the colorant that are the pigment and the dye; thus, any new method for addressing the pigment sedimentation is required, in view of the stability, etc., of the water-based ink. Further, regarding a water-based ink in which the pigment sedimentation is suppressed, there is a demand for a new water-based ink for ink-jet recording in which the chromaticness C* is smaller and which is usable suitably as a water-based ink of an achromatic color such as black color, etc.

In view of the above-described situation, an object of the present teaching is to provide a water-based ink for ink-jet recording which is capable of suppressing the sedimentation of a self-dispersible black pigment, in which the chromaticness C* is smaller, and which is suitably usable as a water-based ink of the achromatic color such as black color, etc.

SUMMARY

According to a first aspect of the present teaching, there is provided a water-based ink for ink-jet recording including:
water;
a self-dispersible black pigment; and
a resin-dispersed pigment of which hue angle is in a range of 180° to 270° and of which sedimentation velocity in the water-based ink is slower than sedimentation velocity of the self-dispersible black pigment in the water-based ink,
wherein a ratio (R/S) of a solid content weight (R) of the resin-dispersed pigment to a solid content weight (S) of the self-dispersible black pigment in the water-based ink is in a range of 0.26 to 0.80.

According to a second aspect of the present teaching, there is provided an ink container which accommodates the water-based ink for ink-jet recording of the first aspect therein.

DESCRIPTION OF THE EMBODIMENTS

Figure 1:
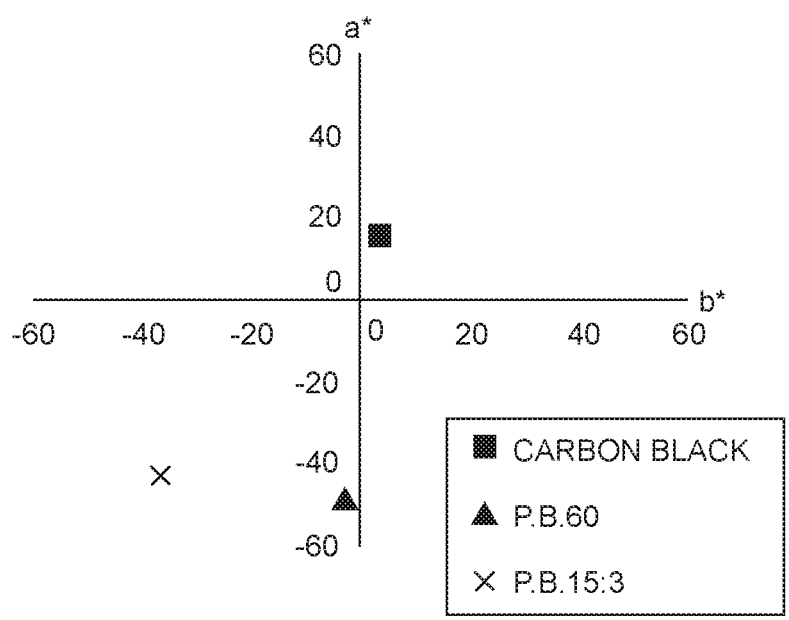
FIG. 1 is a graph indicating, on a plane, "a*" and "b*" of each of 0.002% by weight aqueous dispersion (water dispersion) of a carbon black usable as a material of the self-dispersible black pigment, 0.003% by weight aqueous dispersion of C.I. Pigment Blue 60 (P.B. 60) and 0.002% by weight aqueous dispersion of C.I. Pigment Blue 15:3 (P.B. 15:3).

In the present teaching, the term "hue angle" represents, for example, an angle in the L*a*b* color system chromaticity diagram indicating a* and b* on the plane, and is defined as follows:

In $a^* \geq 0$, $b^* \geq 0$ (first quadrant), the hue angle=$\tan^{-1}(b^*/a^*)$;

In $a^* \leq 0$, $b^* \geq 0$ (second quadrant), the hue angle=$180°+\tan^{-1}(b^*/a^*)$;

In $a^* \leq 0$, $b^* \leq 0$ (third quadrant), the hue angle=$180°+\tan^{-1}(b^*/a^*)$; and In $a^* \geq 0$, $b^* \leq 0$ (fourth quadrant), the hue angle=$360°+\tan^{-1}(b^*/a^*)$.

In the present teaching, the hue angle of the resin-dispersed pigment is determined, for example, by a method described in Examples (to be described later on).

An explanation will be given about a water-based ink related to the present teaching. The water-based ink related to the present teaching contains a colorant and water.

The colorant contains a self-dispersible black pigment, and a resin-dispersed pigment of which hue angle is in a range of 180° to 270°.

The self-dispersible black pigment is dispersible in water without using any dispersing agent, for example, owing to the fact that at least one of the hydrophilic functional group and the salt thereof including, for example, a carbonyl group, a hydroxyl group, a carboxylic acid group, a sulfonic acid group, and a phosphate group is introduced into the surfaces of the black pigment particles (such as particles of carbon black) by the chemical bond directly or with any group intervening therebetween. As the self-dispersible black pigment, it is possible to use a self-dispersible black pigment in which the carbon black is subjected to a treatment by any one of methods described, for example, in Japanese Patent Application Laid-open No. 8-3498 corresponding to U.S. Pat. No. 5,609,671, Published Japanese Translation of PCT International Publication for Patent Application No. 2000-513396 corresponding to U.S. Pat. No. 5,837,045, Published Japanese Translation of PCT International Publication for Patent Application No. 2008-524400 corresponding to U.S. Patent Application Publication No. US2006/0201380, Published Japanese Translation of PCT International Publication for Patent Application No. 2009-515007 corresponding to U.S. Patent Application Publication No. US2007/0100023 and U.S. Patent Application Publication No. US2007/0100024, Published Japanese Translation of PCT International Publication for Patent Application No. 2011-515535 corresponding to U.S. Patent Application Publication No. US2009/0229489, etc. The carbon black, which is suitable to have the surface treatment performed therefor, includes, for example, carbon blacks such as "MA8", "MA100" and "#2650" produced by MITSUBISHI CHEMICAL CORPORATION, etc. As the self-dispersible black pigment, it is allowable to use, for example, any commercially available product. The commercially available product includes, for example, "CAB-O-JET (trade name) 200", "CAB-O-JET (trade name) 300", and "CAB-O-JET (trade name) 400" produced by CABOT CORPORATION; "BONJET (trade name) BLACK CW-2", and "BONJET (trade name) BLACK CW-3" produced by ORIENT CHEMICAL INDUSTRIES, LTD.; and "LIOJET (trade name) WD BLACK 002C" produced by TOYO INK MFG. CO., LTD. It is allowable that only one kind of the self-dispersible black pigment as described above is used singly, or two or more kinds of the self-dispersible black pigment are used in combination.

The hue angle of the self-dispersible black pigment is preferably within a range of 0° to 90°, more preferably within a range of 30° to 90°. By allowing the hue angle of the self-dispersible black pigment to fall within this range, it is possible to obtain a water-based ink of which chromaticness C* is smaller and which is suitably usable as an achromatic water-based ink having an achromatic color such as the black color.

The resin-dispersed pigment (resin-dispersible pigment, resin dispersion type pigment) is dispersible in water by, for example, a pigment-dispersing resin (resin dispersant). As the resin dispersant, it is allowable to use a general resin dispersant. The resin-dispersed pigment may be encapsulated by the resin dispersant.

As described above, the hue angle of the resin-dispersed pigment is within the range of 180° to 270°. By allowing the hue angle of the resin-dispersed pigment to fall within the range of 180° to 270°, it is possible to obtain a water-based ink of which chromaticness C* is smaller and which is suitably usable as an achromatic water-based ink having an achromatic color such as the black color.

It is preferred that the hue angle of the resin-dispersed pigment is in a range of 210° to 270°. The resin-dispersed pigment of which hue angle is in the range of 210° to 270° is exemplified, for example, by C.I. Pigment Blue 60 (P.B. 60) as an anthraquinone based pigment, C.I. Pigment Blue 15:3 (P.B. 15:3) as a copper phthalocyanine based pigment, etc. It is allowable that only one kind of the resin-dispersed pigment as described above is used singly, or two or more kinds of the resin-dispersed pigment are used in combination.

As described above, it is allowable to use, as a the pigment-dispersing resin or the resin for dispersing pigment (resin dispersant), any pigment-dispersing resin of a general type, such as those exemplified by: proteins such as gelatin, albumin, casein, etc.; natural rubbers such as gum arabic, gum traganth, etc.; glucosides such as saponin, etc.; naturally-occurring polymers such as lignin sulfonate, shellac, etc.; anionic polymers such as acrylic acid-acrylic acid ester copolymer and salt thereof, polyacrylate, polymethacrylate, salt of styrene-acrylic acid copolymer, salt of vinylnaphthalene-acrylic acid copolymer, salt of styrene-maleic acid copolymer, salt of maleic acid-maleic anhydride copolymer, salt of vinylnaphthalene-maleic acid copolymer, sodium salt of β-naphthalenesulfonic acid formalin condensate, orthophosphate, etc.; nonionic polymers such as polyvinyl alcohol, polyvinyl pyrrolidone, etc.; and the like.

As described above, the resin-dispersed pigment may be encapsulated by the resin dispersant. However, in view of suppressing the sedimentation of the self-dispersible black pigment, the resin-dispersed pigment is preferably a pigment which is not encapsulated by the resin dispersant. A resin dispersant not encapsulating the pigment spreads in the water-based ink more broadly (widely) as compared with a resin dispersant encapsulating the pigment. This is presumed to realize further suppression of the sedimentation of the self-dispersible black pigment.

The blending amount of the pigment-dispersing resin (resin dispersant) with respect to the entire amount of the water-based ink is not particularly limited, and can be determined appropriately in accordance with the kind of the resin-dispersed pigment, the pigment solid content amount of the pigment, etc. The ratio of the solid content weight of the resin dispersant with respect to the pigment solid content weight of the resin-dispersed pigment in the water-based ink is, for example, in a range of 0.05 to 5.0 or in a range of 1.0 to 3.0.

TABLE 1 indicates L*, a*, b* and the hue angle of each of 0.002% by weight aqueous solution of a carbon black which is usable as a material of the self-dispersible black pigment, 0.003% by weight aqueous solution of P.B. 60 and 0.002% by weight aqueous solution of P.B. 15:3. Further, a graph indicating the a* and b* of each of these aqueous solutions on a plane is depicted in FIG. 1. Note that the mean particle diameter (average particle size) in TABLE 1 can be calculated, for example, by performing dilution such that the solid content amount is in a range of 0.02% by weight to 0.04% by weight and by performing measurement using a dynamic light scattering particle diameter distribution measuring apparatus "LB-550" manufactured by HORIBA, LTD., with the intensity of scattered light as the reference for the mean particle diameter. This is also applicable to those described later on. Here, the "mean particle diameter (average particle size)" means an average particle size of secondary particles rather than primary particles. The "secondary particle" means a particle which is formed by an aggregation of the primary particles. This is also applicable to those described later on.

TABLE 1

|  | Carbon Black | P.B. 60 | P.B. 15:3 |
| --- | --- | --- | --- |
| Mean particle diameter | 155 nm | 120 nm | 104 nm |
| L* | 42.59 | 61.70 | 74.70 |
| a* | 3.78 | −2.80 | −43.00 |
| b* | 15.75 | −48.67 | −36.60 |
| Hue angle (°) | 76.50 | 266.71 | 220.40 |

In FIG. 1, pigments which are positioned relative to each other in point symmetrical positions, with the origin (a*=0, b*=0) as the center, have a relationship of complementary color. Each of P.B. 60 and P.B. 15:3 is located in FIG. 1 at a closely symmetrical position about the origin with respect to the carbon black usable as a material of the self-dispersible black pigment. Accordingly, in a case that at least one of P.B. 60 and P.B. 15:3 is used as the resin-dispersed pigment, it is possible to obtain a water-based ink having a liquid color close to that of a water-based ink containing only the self-dispersible black pigment, namely, to obtain a water-based ink of which chromaticness C* is smaller and which is suitably usable as an achromatic color ink having the achromatic color such as the black color. Among P.B. 60 and P.B. 15:3, it is preferred to use P.B. 60 located at a more closely symmetrical position with respect to the carbon black, in view of the complementary color.

In view of obtaining an appropriate color (achromatic color) by making the chromaticness C* be small, as a value obtaining by subtracting the hue angle of the self-dispersible black pigment from the hue angle of the resin-dispersed pigment (the difference between the hue angle of the resin-dispersed pigment and the hue angle of the self-dispersible black pigment) is closer to 180°, it is more preferred. The value (difference) is, for example, in a range of 140° to 220°, or in a range of 165° to 195°.

In the water-based ink, the sedimentation velocity of the resin-dispersed pigment is slower than sedimentation velocity of the self-dispersible black pigment. Namely, the resin-dispersed pigment is harder (less likely) to sediment than the self-dispersible black pigment in the water-based ink. With this, the sedimentation of the self-dispersible black pigment can be suppressed. Although the details of the mechanism of suppressing the sedimentation is not clear, it is presumed that a resin dispersant for (dispersing) the resin-dispersed pigment suppresses the sedimentation of the self-dispersible black pigment. This mechanism, however, is merely a presumption, and the present teaching is not limited to or restricted by this presumed mechanism.

The sedimentation velocity of the self-dispersible black pigment and the sedimentation velocity of the resin-dispersed pigment can be compared, for example, by an evaluation of sedimentation performed in Examples which will be described later on. The evaluation of sedimentation includes, for example: performing a predetermined centrifuging processing for each of a sample including the resin-dispersed pigment and a sample including the self-dispersible black pigment; measuring viscosity before the centrifuging processing and viscosity after the centrifuging processing in each of the sample including the resin-dispersed pigment and the sample including the self-dispersible black pigment; and calculating a viscosity increasing rate of the viscosity after the centrifuging processing with respect to the viscosity before the centrifuging processing in each of the sample including the resin-dispersed pigment and the sample including the self-dispersible black pigment. In the evaluation of sedimentation, it is possible to determine that as the viscosity increasing rate of a certain sample is lower, the pigment in the certain sample is harder to sediment (is less likely to sediment). Namely, as a sample containing the pigment therein has a smaller viscosity increasing rate, the pigment has a smaller (slower) sedimentation velocity. Accordingly, in the present teaching, the viscosity increasing rate of the sample including the resin-dispersed pigment is lower than the viscosity increasing rate of the sample including the self-dispersible black pigment.

The sedimentation velocities of the self-dispersible black pigment and the resin-dispersed pigment can be adjusted each depending on the density, the mean particle diameter, etc., thereof. For example, by making the density of the self-dispersible black pigment to be higher than the density of the resin-dispersed pigment, it is possible to make the sedimentation velocity of the resin-dispersed pigment to be slower than the sedimentation velocity of the self-dispersible black pigment. Alternatively, for example, by making the mean particle diameter of the self-dispersible black pigment to be greater than the mean particle diameter of the resin-dispersed pigment, it is possible to make the sedimentation velocity of the resin-dispersed pigment to be slower than the sedimentation velocity of the self-dispersible black pigment.

For example, the density of the self-dispersible black pigment is in a range of 1.05 times to 1.88 times, in a range of 1.07 times to 1.78 times, or in a range of 1.11 times to 1.58 times the density of the resin-dispersed pigment. Further, for example, the difference between the density of the self-dispersible black pigment and the density of the resin-dispersed pigment is in a range of 0.18 g/cm$^3$ to 0.77 g/cm$^3$, or in a range of 0.25 g/cm$^3$ to 0.55 g/cm$^3$. The density of the self-dispersible black pigment is, for example, in a range of 1.8 g/cm$^3$ to 2.1 g/cm$^3$. The density of the resin-dispersed pigment is, for example, in a range of 1.3 g/cm$^3$ to 1.6 g/cm$^3$.

For example, the mean particle diameter (average particle size) of the self-dispersible black pigment is in a range of 1.05 times to 2.00 times, in a range of 1.07 times to 1.75 times, or in a range of 1.08 times to 1.49 times the mean particle diameter (average particle size) of the resin-dispersed pigment. Further, for example, the difference between the mean particle diameter of the self-dispersible black pigment and the mean particle diameter of the resin-dispersed pigment is in a range of 5 nm to 100 nm, in a range of 7 nm to 70 nm, or in a range of 9 nm to 51 nm. The mean particle diameter of the self-dispersible black pigment is, for example, in a range of 135 nm to 210 nm, in a range of 135 nm to 175 nm, or in a range of 135 nm to 155 nm. The mean particle diameter of the resin-dispersed pigment is, for example, is in a range of 80 nm to 150 nm, in a range of 100 nm to 126 nm, or in a range of 104 nm to 120 nm.

A ratio (S:R) of a solid content weight (S) of the self-dispersible black pigment to a solid content weight (R) of the resin-dispersed pigment in the entire amount of the water-based ink is in a range of S:R=1:0.26 to 1:0.80. Namely, the ratio (R/S) of the solid content weight (R) of the resin-dispersed pigment to the solid content weight (S) of the self-dispersible black pigment in the water-based ink is in a range of 0.26 to 0.80. In view of the suppressing the sedimentation of the self-dispersible black pigment, the ratio (S:R) is preferably in a range of S:R=1:0.45 to 1:0.56 ((R/S)=0.45 to 0.56). The solid content weight (R) is a weight only of the pigment, and does not include the weight of the resin dispersant. It is allowable that the solid content weight (S) and the solid content weight (R) are appropriately adjusted such that the ratio S:R=1:0.26 to 1:0.80 is provided; the solid content weight (S) is, for example, in a range of 1.0% by weight to 7.0% by weight, in a range of 3.0% by weight to 5.0% by weight, or in a range of 3.5% by weight to 4.5% by weight; and the solid content weight (R) is, for example, in a range of 0.26% by weight to 5.6% by weight, in a range of 0.78% by weight to 4.0% by weight, or in a range of 0.91% by weight to 3.6% by weight.

A sum (S+R) of the solid content weight (S) and the solid content weight (R) is, for example, in a range of 4% by weight to 11% by weight, in a range of 5% by weight to 8% by weight, or in a range of 5% by weight to 6% by weight.

It is allowable that the water-based ink also additionally contains a colorant, such as a pigment, a dye, etc., different from the self-dispersible black pigment and the resin-dispersed pigment of which hue angle is within the range of 180° to 270°; or it is allowable that the water-based ink does not contain any colorant, such as a pigment, a dye, etc., different from the self-dispersible black pigment and the resin-dispersed pigment of which hue angle is within the range of 180° to 270°. However, in view of obtaining an appropriate color (achromatic color) by making the chromaticness C* be small, it is preferred that the colorant is substantially composed of the self-dispersible black pigment and the resin-dispersed pigment of which hue angle is within the range of 180° to 270°. Further, from a similar viewpoint as described above, it is preferred that the colorant is substantially composed of the self-dispersible black pigment of which hue angle is within the range of 0° to 90° and the resin-dispersed pigment of which hue angle is within the range of 180° to 270°. A rate of the sum (S+R) of the solid content weight (S) of the self-dispersible black pigment and the solid content weight (R) of the resin-dispersed pigment with respect to the entire weight of the colorant is, for example, in a range of 95% by weight to 100% by weight, or in a range of 98% by weight to 100% by weight.

The water is preferably ion-exchange water or purified water (pure water). The blending amount of the water with respect to the entire amount of the water-based ink may be, for example, a balance of the other components.

The water-based ink may further contain a water-soluble organic solvent. The water-soluble organic solvent is exemplified, for example, by a humectant which prevents the water-based ink from drying at an end of a nozzle in an ink-jet head, a penetrant which adjusts the drying velocity on a recording medium, etc.

The humectant is not particularly limited, and is exemplified, for example, by lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyethers such as polyalkylene glycol; polyvalent alcohols such as alkylene glycol, glycerol, trimethylolpropane, trimethylolethane, etc.; 2-pyrrolidone; N-methyl-2-pyrrolidone; 1,3-dimethyl-2-imidazolidinone; and the like. The polyalkylene glycol is exemplified, for example, by polyethylene glycol, polypropylene glycol, etc. The alkylene glycol is exemplified, for example, by ethylene glycol, propylene glycol, butylene glycol, diethylene glycol, triethylene glycol, dipropylene glycol, tripropylene glycol, thiodiglycol, hexylene glycol, etc. It is allowable that only one kind of the humectant as described above is used singly, or two or more kinds of the humectant are used in combination. Among the above-described humectants, the humectant is preferably a polyvalent alcohol such as alkylene glycol, glycerol, etc.

The blending amount of the humectant in the entire amount of the water-based ink is, for example, in a range of 0% by weight to 95% by weight, in a range of 5% by weight to 80% by weight, or in a range of 5% by weight to 50% by weight.

The penetrant is not particularly limited, and is exemplified, for example, by glycol ether. The glycol ether is not particularly limited, and is exemplified, for example, by ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, etc. One type of the penetrant may be used singly, or two or more kinds of the penetrant may be used in combination.

The blending amount of the penetrant in the entire amount of the water-based ink is, for example, in a range of 0% by weight to 20% by weight, in a range of 0% by weight to 15% by weight, or in a range of 1% by weight to 6% by weight.

The water-based ink may further contain an anionic surfactant. The anionic surfactant is exemplified, for example, by alkyl sulfuric acid salt, alkyl ester sulfuric acid salt, alkyl ether sulfuric acid ester salt, alkylbenzene sulfonate, alkyl phosphate, α-olefin sulfonate sodium salt (sodium α-olefin sulfonate), sulfosuccinic acid, etc. As the anionic surfactant, for example, a commercially available product may be used. The commercially available product is exemplified, for example, by anionic surfactants produced by LION SPECIALTY CHEMICALS CO., LTD., including "LIPOLAN (trade name)" series, "LIPON (trade name)" series, "SUNNOL (trade name)" series, "LIPOTAC (trade name) series, ENAGICOL (trade name)" series, "LIPAL (trade name)" series, and "LOTAT (trade name)" series, etc.; anionic surfactants produced by KAO CORPORATION including "EMAL (trade name)" series, "LATEMUL (trade name)" series, "VENOL (trade name)" series, "NEOPELEX (trade name)" series, NS SOAP, KS SOAP, OS SOAP, and "PELEX (trade name)" series, etc.; anionic surfactants produced by SANYO CHEMICAL INDUSTRIES, LTD. including "SANDET (trade name)" series and "BEAULIGHT (trade name)" series, etc.; anionic surfactants produced by TOHO CHEMICAL INDUSTRY CO., LTD. including "ALSCOPE (trade name)" series, "NEOSCOPE (trade name)" series, "PHOSFANOL (trade name)" series, etc.; sodium hexadecyl sulfate, sodium stearyl sulfate, etc. produced by TOKYO CHEMICAL INDUSTRY CO., LTD.; and the like.

The blending amount of the anionic surfactant in the entire amount of the water-based ink is, for example, not more than 5% by weight, not more than 3% by weight, or in a range of 0.1% by weight to 2% by weight.

The water-based ink may further contain a nonionic surfactant. As the nonionic surfactant, it is allowable to use, for example, a commercially available product. The commercial available product is exemplified, for example, by "OLFIN (trade name) E1010", "OLFIN (trade name) E1004", etc., produced by NISSHIN KAGAKU KOGYO KK, etc.

The blending amount of the nonionic surfactant in the entire amount of the water-based ink is, for example, not more than 5% by weight, not more than 3% by weight, or in a range of 0.1% by weight to 2% by weight.

The water-based ink may further contain a resin, in addition to the resin dispersant, for the purpose of improving the fixing property of the water-based ink.

The water-based ink may further contain a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, etc.

The water-based ink can be prepared, for example, by uniformly mixing the self-dispersible black pigment, the resin-dispersed pigment, water, and an optionally another additive(s) as necessary, by a known method, and then removing any non-dissolved matter, etc., with a filter, etc.

As described above, according to the present teaching, by using the self-dispersible black pigment and the resin-dispersed pigment of which hue angle is within a predetermined range, in combination under a predetermined condition, it is possible to provide a water-based ink for ink-jet recording which is capable of suppressing the sedimentation of the self-dispersible black pigment, of which chromaticness C* is smaller, and which is usable suitably as a water-based ink of the achromatic color such as the black color, etc.

Next, an ink cartridge (an example of an ink container) of the present teaching will be explained. The ink cartridge of the present teaching is characterized by being an ink cartridge containing a water-based ink for ink-jet recording; wherein the water-based ink is the water-based ink for ink-jet recording of the present teaching as described above. Namely, the ink cartridge (ink container) related to the present teaching contains the water-based ink for ink-jet recording of the present teaching in the inside thereof. Any known main body (body) of an ink cartridge can be used as the main body of the ink cartridge of the present teaching.

Next, explanation will be given about an ink-jet recording apparatus related to the present teaching.

The ink-jet recording apparatus related to the present teaching is an ink-jet recording apparatus characterized by including: an ink accommodating section configured to accommodate an ink therein; and an ink discharge mechanism configured to discharge the ink accommodated in the ink accommodating section; wherein the ink accommodated in the ink accommodating section is the water-based ink for ink-jet recording related to the present teaching.

Figure 2:
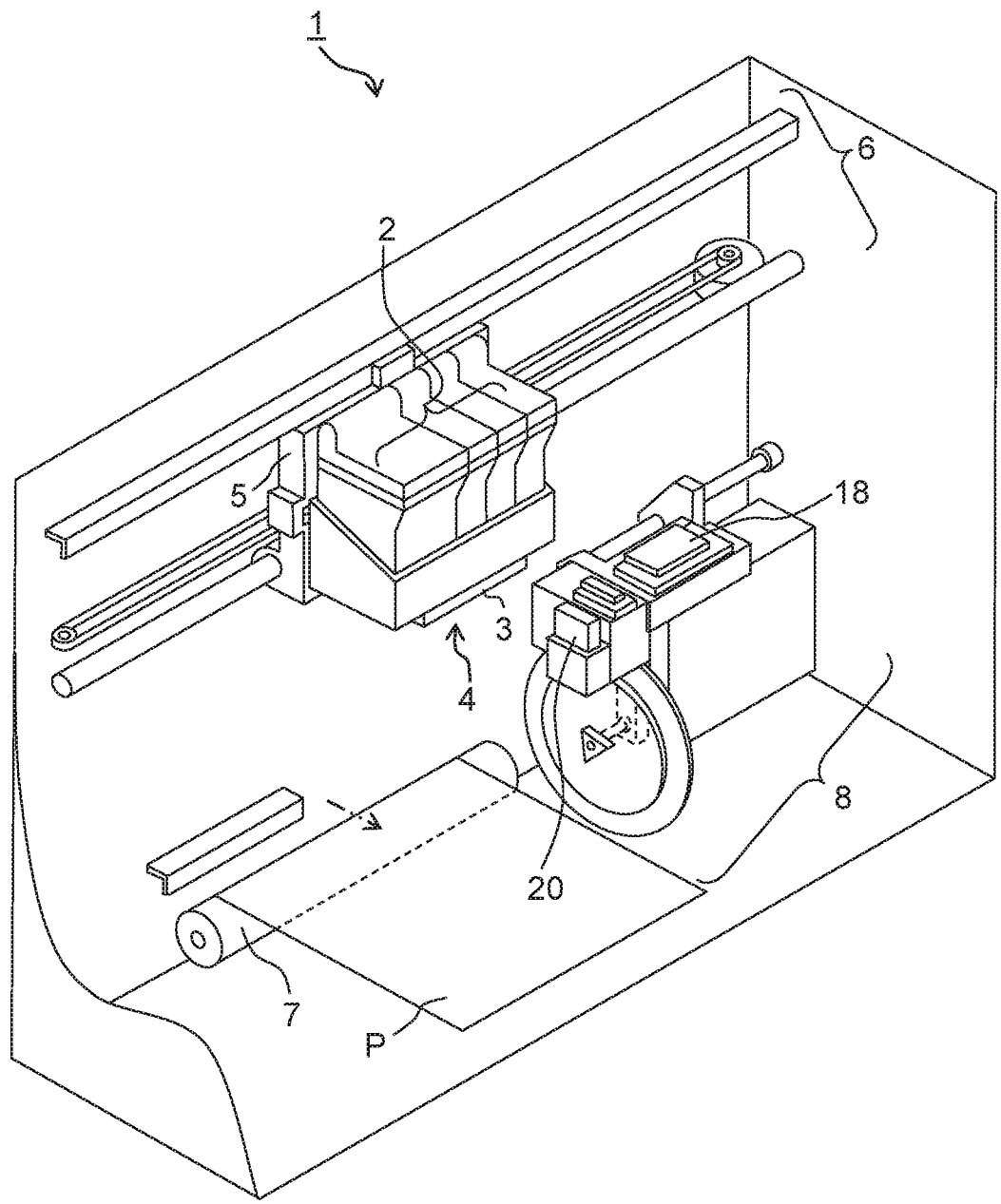
FIG. 2 is a schematic perspective view depicting the configuration of an example of an ink-jet recording apparatus related to the present teaching.

FIG. 2 depicts the configuration of an example of the ink-jet recording apparatus related to the present teaching. As depicted in FIG. 2, an ink-jet recording apparatus 1 related to the present teaching includes four ink cartridges (ink containers) 2, an ink discharge mechanism (ink-jet head) 3, a head unit 4, a carriage 5, a driving unit 6, a platen roller 7 and a purge device 8 as main constitutive components or parts.

The four ink cartridges 2 contain water-based inks of four colors, respectively, the four colors being yellow, magenta, cyan and black. For example, the water-based black ink is the water-based ink for ink-jet recording related to the present teaching. In this example, a set of the four ink cartridges 2 is described. However, it is allowable to use an integrated ink cartridge of which interior (inner part) is partitioned so as to form an accommodating section for the water-based yellow ink, an accommodating section for the water-based magenta ink, an accommodating section for the water-based cyan ink and an accommodating section for the water-based black ink, instead of using the set of the four ink cartridges 2. As the body of the ink cartridge, it is possible to use, for example, a publicly known body.

The ink-jet head 3 disposed on the head unit 4 performs recording on a recording medium (for example, recording paper or recording sheet) P. The four ink cartridges 2 and the head unit 4 are provided or arranged on the carriage 5. The driving unit 6 reciprocates the carriage 5 in a linear direction. As the driving unit 6, it is possible to use, for example, a known driving unit (see, for example, Japanese Patent Application laid-open No. 2008-246821 corresponding to United States Patent Application Publication No. US2008/0241398). The platen roller 7 extends in the reciprocating direction of the carriage 5 and is arranged to face or be opposite to the ink-jet head 3.

The purge device 8 sucks or draws unsatisfactory ink (poor ink) which contains air bubbles, etc. accumulated or trapped in the inside of the ink-jet head 3. As the purge device 8, it is possible to use, for example, a known purge device (see, for example, Japanese Patent Application laid-open No. 2008-246821 corresponding to United States Patent Application Publication No. US2008/0241398).

A wiper member 20 is provided on the purge device 8, at a position on the side of the platen roller 7 such that the wiper member 20 is adjacent to the purge device 8. The wiper member 20 is formed to have a spatula shape, and wipes a nozzle-formed surface of the ink-jet head 3 accompanying with the movement (reciprocating movement) of the carriage 5. In FIG. 2, a cap 18 is provided to cover a plurality of nozzles of the ink-jet head 3 which is returned to a reset position upon completion of the recording, so as to prevent the water-based inks from drying.

In the ink-jet recording apparatus 1 of the present embodiment, the four ink cartridges 2 are provided, together with the head unit 4, on one carriage 5. However, the present teaching is not limited to this. In the ink-jet recording apparatus 1, the respective four ink cartridges 2 may be provided on a carriage which is different (separate) from the carriage on which the head unit 4 is provided. Alternatively, the respective four ink cartridges 2 may be arranged and fixed inside the ink-jet recording apparatus 1, rather than being provided on the carriage 5. In such aspects, for example, each of the four ink cartridges 2 and the head unit 4 which is provided on the carriage 5 are connected with a tube, etc., and the water-based inks are supplied from the four cartridges 2, respectively, to the head unit 4 via the tubes. Further, in these aspects, it is allowable to use, as the ink containers, four ink bottles having a bottle shape, instead of using the four ink cartridges 2. In such a case, each of the ink bottles may be provided with an inlet port via which the ink is poured from the outside to the inside of the ink bottle.

Ink-jet recording using the ink-jet recording apparatus 1 is performed, for example, in the following manner. Namely, at first, a recording paper P is supplied or fed, for example, from a paper feeding cassette or sheet feeding cassette (not depicted in the drawing) arranged at a side of or at a position below the ink-jet recording apparatus 1. The recording paper P is introduced or guided between the ink-jet head 3 and the platen roller 7. Then, a predetermined recording is performed on the fed or introduced recording paper P with the water-based ink(s) discharged or jetted from the ink-jet head 3. According to the present teaching, the sedimentation of the pigment is suppressed, and thus any discharge failure (jetting failure) in the ink-jet head 3 is suppressed. The recording paper P after the recording is discharged from the ink-jet recording apparatus 1. According to the present teaching, it is possible to obtain a recorded matter in which the black color is close to an achromatic color obtained in a case of using a water-based ink containing only the self-dispersible black pigment, and in which the non-uniform density is suppressed. In FIG. 2, the paper feeding mechanism and paper discharge mechanism for the recording paper P are omitted in the drawing.

In the apparatus depicted in FIG. 2, an ink-jet head of serial type (serial type ink-jet head) is adopted. However, the present teaching is not limited to this. The ink-jet recording apparatus may be an apparatus adopting an ink-jet head of line type (line type ink-jet head).

Next, an ink-jet recording method related to the present teaching is an ink-jet recording method characterized by including: performing recording on a recording medium by discharging, to the recording medium, a water-based ink by an ink-jet system; and using the water-based ink for ink-jet recording related to the present teaching, as the water-based ink. The recording includes printing a letter (text), printing an image, printing, etc.

EXAMPLES

Next, examples related to the present teaching will be explained together with comparative examples. Note that the present teaching is not limited to and is not restricted by the examples and the comparative examples which will be described below.

<Preparation of Aqueous Pigment Dispersion 1>

40 g of Carbon Black "#2650" produced by MITSUBISHI CHEMICAL CORPORATION was mixed with 200 g of ion-exchanged water, followed by being pulverized by a bead mill. The pulverized mixture was added with a carboxyl group agent, followed by being heated and agitated, and subjected to an oxidation processing. The obtained liquid was cleaned with a solvent for several times, was poured into water, and was cleaned again with the water in a repeated manner. Then, the liquid was filtrated with a filter, and thus a water (aqueous) pigment dispersion 1 indicated in TABLE 2 was obtained. The mean particle diameter (average particle size) of the carbon black contained in the aqueous pigment dispersion 1 was measured by using the dynamic light scattering particle diameter distribution measuring apparatus "LB-550" (product name) manufactured by HORIBA, LTD., and the mean particle diameter was 155 nm.

<Preparation of Aqueous Pigment Dispersions 2 to 4>

Aqueous pigment dispersions 2, 3 and 4 in each of which a pigment was dispersed in water by a dispersant were prepared by the following method. Pure water (purified water) was added to 20% by weight of a pigment (P.B. 60) and 7% by weight of a styrene-acrylic acid copolymer neutralized by sodium hydroxide (acid value: 175 mgKOH/g, molecular weight: 10000) so that the entire amount thereof was 100% by weight, followed by being agitated and mixed, and thus a mixture was obtained. The obtained mixture was placed in a wet sand mill charged with zirconia beads of which diameter was 0.3 mm, and was subjected to a dispersing process for 6 hours. Afterwards, the zirconia beads were removed by a separator, and the mixture was filtrated through a cellulose acetate filter (pore size 3.0 μm). Thus, aqueous pigment dispersion 2 indicated in TABLE 2 was obtained. Note that the styrene-acrylic acid copolymer is a water-soluble polymer which is generally used as a dispersant for pigment (pigment dispersant). Further, aqueous pigment dispersions 3 and 4 indicated in TABLE 2 were obtained in a similar manner regarding the aqueous pigment dispersion 2 except for appropriately changing the kind of pigment, the component rate and the duration time of dispersing process. Note that in the legend of TABLE 2, "P.R. 122" represents C.I. pigment red 122.

Examples 1 to 12 and Comparative Examples 1 to 8

Components, except for the aqueous pigment dispersions 1 to 4, which were included in Water-based Ink Composition (TABLE 2) were mixed uniformly or homogeneously; and thus an ink solvent was obtained. Subsequently, the ink solvent was added to the aqueous pigment dispersion 1 and to any one of the aqueous pigment dispersion 2 to 4 (in Comparative Example 1, only to the aqueous pigment dispersion 1), followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus a water-based ink for ink jet recording of each of Examples 1 to 12 and Comparative Examples 1 to 8 indicated in TABLE 2 was obtained. Note that in the legend of TABLE 2, the hue angles of the aqueous solutions of the self-dispersible black pigment, P.B. 60, P.B. 15:3 and P.R. 122 were obtained with the following method.

<Method for Obtaining Hue Angle>

Regarding a 0.002% by weight aqueous solution of the self-dispersible black pigment, a 0.003% by weight aqueous solution of P.B. 60, a 0.002% by weight aqueous solution of P.B. 15:3 and a 0.004% by weight aqueous solution of P.R. 122, color measurement was performed using a spectrophotometer UV 3600 manufactured by SHIMADZU CORPORATION, for a measuring cell having a cell length of 10 mm with pure water (purified water) as the reference, and thus the $L^*$ value, the $a^*$ value and $b^*$ value were obtained for each of the above-described aqueous solutions. Each of the $L^*$ value, the $a^*$ value and $b^*$ value is based on the $L^*a^*b$ color system (CIE 1976 ($L^*a^*b^*$) color system) normalized in 1976 by Commission Internationale d'Eclairage (CIE) (see JIS Z 8729). From the $a^*$ value and $b^*$ value, the hue angle was obtained by the above-described definition equation of the hue angle.

With respect to the water-based inks of Examples 1 to 12 and Comparative Examples 1 to 8, respectively, (a) Evaluation of sedimentation and (b) Evaluation of the color (tone, tint) of liquid were performed by the following methods.

(a) Evaluation of Sedimentation 40 mL of the water-based ink of each of the examples and the comparative examples was placed in a 50 mL centrifugal settling tube, and was subjected to a centrifuging processing using a High-speed micro centrifugal CF16RXII and Angle Rotor: T6AP31 manufactured by HITACHI KOKI CO., LTD., under a condition of 6,000 rpm and for 10 minutes. Afterwards, 2 mL of the water-based ink was taken out from a bottom part of the centrifugal settling tube, the viscosity of the water-based ink was measured, and the viscosity increasing rate from the initial viscosity before the centrifuging processing was calculated. The viscosity is a value measured at 25° C. by using a viscometer TVE-25 manufactured by TOM SANGYO CO., LTD. Note that the viscosity increasing rate in water-based inks (samples) in each of which one of the aqueous pigment dispersions 1 to 4 was diluted with water such that the pigment solid content weight became to be 4% by weight (such that the initial viscosity became about 4 mPa·s) was as follows. As the viscosity increasing rate of a water-based ink is lower, it is possible to determine that the sedimentation of the pigment is harder to occur (less likely to occur or hardly occurs) in the water-based ink. Namely, in the evaluation of the sedimentation, it is possible to determine that as a sample (water-based ink) containing the pigment therein has a smaller viscosity increasing rate, the pigment has a smaller sedimentation velocity.

|  | Viscosity increasing rate |
|---|---|
| Aqueous pigment dispersion 1 (self-dispersible black pigment) | 30% |
| Aqueous pigment dispersion 2 (P.B. 60) | 12% |
| Aqueous pigment dispersion 3 (P.B. 15:3) | 10% |
| Aqueous pigment dispersion 4 (P.R. 122) | 12% |

<Criterion for Evaluation of Sedimentation>

AA: The viscosity increasing rate was less than 26%.

A: The viscosity increasing rate was in a range of not less than 26% to less than 29%.

B: The viscosity increasing rate was not less than 29%.

(b) Evaluation of Color of Liquid

The water-based ink of each of the examples and the comparative examples was diluted such that the solid content weight of the pigment became 0.002% by weight, the color measurement was performed using the spectrophotometer UV 3600, for a measuring cell having a cell length of 10 mm with pure water (purified water) as the reference, and thus the L* value, the a* value and b* value were obtained for the water-based ink of each of the examples and the comparative examples. Each of the L* value, the a* value and b* value is based on the L*a*b color system (CIE 1976 (L*a*b*) color system) normalized in 1976 by Commission Internationale d'Eclairage (CIE) (see JIS Z 8729). From the a* value and b* value, the chromaticness C* was calculated by the following expression, and the evaluation was made based on the following criterion of the evaluation. Note that as appreciated from the following expression, the chromaticness C* corresponds to a distance, in the graph indicating a* and b* on a plane, from the position of the water-based ink of each of the examples and the comparative examples to origin: a*=0 and b*=0; as the chromaticness C* of a water-based ink is smaller, it is possible to determine that the water-based ink is more preferred as an achromatic color water-based ink such as a black water-based ink, etc.

$$C^* = \{(a^{*2}) + (b^{*2})\}^{1/2}$$

<Criterion for Evaluation of Color of Liquid>
AA: C* is less than 10.
A: C* is in a range of not less than 10 to less than 20.
B: C* is not less than 20.

The water-based ink composition and the results of evaluations of each of the water-based inks of Examples 1 to 12 and Comparative Examples 1 to 8 are indicated in TABLE 2.

Table 2 (Following)—Legend

1: Aqueous dispersion of self-dispersible black pigment; hue angle: 76.50°; mean particle diameter: 155 nm; numeral in the table indicates pigment solid content weight; density of pigment: 1.8 g/cm³.
2: Aqueous dispersion of P.B. 60 (containing resin dispersant); hue angle: 266.71°; mean particle diameter: 120 nm; numeral in the table indicates pigment solid content weight; density of pigment: 1.3 g/cm³.
3: Aqueous dispersion of P.B. 15:3 (containing resin dispersant); hue angle: 220.40°; mean particle diameter: 104 nm; numeral in the table indicates pigment solid content weight; density of pigment: 1.62 g/cm³.
4: Aqueous dispersion of P.R. 122 (containing resin dispersant); hue angle: 330.36°; mean particle diameter: 126 nm; numeral in the table indicates pigment solid content weight; density of pigment: 1.5 g/cm³.
5: Surfactant, manufactured by LION SPECIALTY CHEMICALS CO., LTD.; effective ingredient amount: 28% by weight; numeral in the table indicates the effective ingredient amount.

The unit in the water-based ink composition in TABLE 2: % by weight

TABLE 2

| | | EXAMPLES | | | | | |
|---|---|---|---|---|---|---|---|
| | | 1 | 2 | 3 | 4 | 5 | 6 |
| Water-based ink Composition (% by weight) | Aqueous pigment dispersion 1 (S) (*1) | 3.75 | 3.75 | 3.75 | 3.75 | 3.75 | 7.00 |
| | Aqueous pigment dispersion 2 (R) (*2) | 1.00 | 1.70 | 2.00 | 2.10 | 3.00 | 3.50 |
| | Aqueous pigment dispersion 3 (R) (*3) | — | — | — | — | — | — |
| | Aqueous pigment dispersion 4 (R) (*4) | — | — | — | — | — | — |
| | Glycerol | 27.50 | 25.20 | 24.50 | 23.40 | 20.30 | 16.00 |
| | Triethylene glycol-n-butyl ether | 5.00 | 5.00 | 5.00 | 5.00 | 5.00 | 5.00 |
| | SUNNOL (trade name) NL1430 (*5) | 1.00 | 1.00 | 1.00 | 1.00 | 1.00 | 1.00 |
| | Water | balance | balance | balance | balance | balance | balance |
| | S:R | 1:0.27 | 1:0.45 | 1:0.53 | 1:0.56 | 1:0.80 | 1:0.50 |
| | Evaluation of sedimentation | A | AA | AA | AA | A | AA |
| | Evaluation of color of liquid | AA | AA | AA | AA | AA | AA |

| | | EXAMPLES | | | | | |
|---|---|---|---|---|---|---|---|
| | | 7 | 8 | 9 | 10 | 11 | 12 |
| Water-based ink Composition (% by weight) | Aqueous pigment dispersion 1 (S) (*1) | 3.80 | 3.80 | 3.80 | 3.80 | 3.80 | 7.00 |
| | Aqueous pigment dispersion 2 (R) (*2) | — | — | — | — | — | — |
| | Aqueous pigment dispersion 3 (R) (*3) | 1.00 | 1.70 | 2.03 | 2.10 | 3.00 | 3.50 |
| | Aqueous pigment dispersion 4 (R) (*4) | — | — | — | — | — | — |
| | Glycerol | 28.00 | 27.10 | 26.50 | 25.50 | 22.70 | 17.50 |
| | Triethylene glycol-n-butyl ether | 5.00 | 5.00 | 5.00 | 5.00 | 5.00 | 5.00 |
| | SUNNOL (trade name) NL1430 (*5) | 1.00 | 1.00 | 1.00 | 1.00 | 1.00 | 1.00 |
| | Water | balance | balance | balance | balance | balance | balance |
| | S:R | 1:026 | 1:0.45 | 1:0.53 | 1:0.55 | 1:0.79 | 1:0.50 |
| | Evaluation of sedimentation | A | AA | AA | AA | A | AA |
| | Evaluation of color of liquid | AA | A | A | A | A | AA |

| | | COMPARATIVE EXAMPLES | | | | | | | |
|---|---|---|---|---|---|---|---|---|---|
| | | 1 | 2 | 3 | 4 | 5 | 6 | 7 | 8 |
| Water-based ink Composition (% by weight) | Aqueous pigment dispersion 1 (S) (*1) | 3.75 | 3.75 | 3.75 | 3.75 | 3.80 | 3.80 | 3.80 | 3.75 |
| | Aqueous pigment dispersion 2 (R) (*2) | — | 0.90 | 3.10 | 3.75 | — | — | — | — |
| | Aqueous pigment dispersion 3 (R) (*3) | — | — | — | — | 0.95 | 3.10 | 3.80 | — |
| | Aqueous pigment dispersion 4 (R) (*4) | — | — | — | — | — | — | — | 2.04 |
| | Glycerol | 29.10 | 18.50 | 18.50 | 18.50 | 20.30 | 20.30 | 20.30 | 26.30 |
| | Triethylene glycol-n-butyl ether | 5.00 | 5.00 | 5.00 | 5.00 | 5.00 | 5.00 | 5.00 | 5.00 |
| | SUNNOL (trade name) NL1430 (*5) | 1.00 | 1.00 | 1.00 | 1.00 | 1.00 | 1.00 | 1.00 | 1.00 |
| | Water | balance | balance | balance | balance | balance | balance | balance | balance |

TABLE 2-continued

| S:R | — | 1:0.24 | 1:0.83 | 1:1 | 1:0.25 | 1:0.82 | 1:1 | 1:0.54 |
|---|---|---|---|---|---|---|---|---|
| Evaluation of sedimentation | B | B | B | B | B | B | B | AA |
| Evaluation of color of liquid | A | AA | AA | AA | AA | A | B | B |

As indicated in TABLE 2, in Examples 1 to 12, the result of evaluation of sedimentation and the result of evaluation of color of liquid were satisfactory. In Examples 2 to 4, 6, 8 to 10 and 12 each satisfying S:R=1:0.45 to 1:0.56 (R/S=0.45 to 0.56), the result of evaluation of sedimentation was particularly excellent. Further, in Examples 1 to 6 each using P.B. 60 as the self-dispersible black pigment, the result of evaluation of color of liquid was particularly excellent.

On the other hand, in Comparative Example 1 which did not use the resin-dispersed pigment and Comparative Examples 2 to 7 in each of which R/S was less than 0.26 or exceeded 0.80, either one or both of the result of evaluation of sedimentation and the result of evaluation of color of liquid was/were unsatisfactory. Further, in Comparative Example 8 using, as the resin-dispersed pigment, P.R. 122 of which hue angle was not in the range of 180° to 270°, the result of evaluation of color of liquid was unsatisfactory.

As described above, the water-based ink related to the present teaching is capable of suppressing the sedimentation of the self-dispersible black pigment, has the chromaticness C* which is smaller, and is suitably usable as a water-based ink of the achromatic color such as black color, etc. The applicability of the water-based ink related to the present teaching is not particularly limited, and is widely applicable to a variety of kinds of ink-jet recording.

What is claimed is:

1. A water-based ink for ink-jet recording comprising:
    water;
    a self-dispersible black pigment; and
    a resin-dispersed pigment of which a hue angle is in a range of 180° to 270° and of which sedimentation velocity in the water-based ink is slower than sedimentation velocity of the self-dispersible black pigment in the water-based ink,
    wherein a ratio (R/S) of a solid content weight (R) of the resin-dispersed pigment to a solid content weight (S) of the self-dispersible black pigment in the water-based ink is in a range of 0.26 to 0.80.

2. The water-based ink for ink-jet recording according to claim 1, wherein the ratio (R/S) of the solid content weight (R) of the resin-dispersed pigment to the solid content weight (S) of the self-dispersible black pigment in the water-based ink is in a range of 0.45 to 0.56.

3. The water-based ink for ink-jet recording according to claim 1, wherein the hue angle of the resin-dispersed pigment is in a range of 210° to 270°.

4. The water-based ink for ink-jet recording according to claim 1, wherein the resin-dispersed pigment is at least one of an anthraquinone based pigment and a copper phthalocyanine based pigment.

5. The water-based ink for ink-jet recording according to claim 4, wherein the resin-dispersed pigment is at least one of C.I. Pigment Blue 60 and C.I. Pigment Blue 15:3.

6. The water-based ink for ink-jet recording according to claim 5, wherein the resin-dispersed pigment is the C.I. Pigment Blue 60.

7. The water-based ink for ink-jet recording according to claim 1, wherein the self-dispersible black pigment is carbon black.

8. The water-based ink for ink-jet recording according to claim 1, wherein a hue angle of the self-dispersible black pigment is in a range of 0° to 90°.

9. The water-based ink for ink-jet recording according to claim 1, wherein mean particle diameter of the self-dispersible black pigment is in a range of 1.05 times to 2.00 times mean particle diameter of the resin-dispersed pigment.

10. The water-based ink for ink-jet recording according to claim 9, wherein a difference between the mean particle diameter of the self-dispersible black pigment and the mean particle diameter of the resin-dispersed pigment is in a range of 5 nm to 100 nm.

11. The water-based ink for ink-jet recording according to claim 1, wherein a density of the self-dispersible black pigment is in a range of 1.05 times to 1.88 times a density of the resin-dispersed pigment.

12. The water-based ink for ink-jet recording according to claim 11, wherein a difference between the density of the self-dispersible black pigment and the density of the resin-dispersed pigment is in a range of 0.18 g/cm$^3$ to 0.77 g/cm$^3$.

13. The water-based ink for ink-jet recording according to claim 1, wherein a sum (S+R) of the solid content weight (S) of the self-dispersible black pigment and the solid content weight (R) of the resin-dispersed pigment in the water-based ink is in a range of 4% by weight to 11% by weight.

14. The water-based ink for ink-jet recording according to claim 1, wherein the resin-dispersed pigment is harder to sediment than the self-dispersible black pigment in the water-based ink.

15. The water-based ink for ink-jet recording according to claim 1, wherein in an evaluation of sedimentation, a viscosity increasing rate of a sample including the resin-dispersed pigment is lower than a viscosity increasing rate of a sample including the self-dispersible black pigment, the evaluation of the sedimentation including:
    performing a predetermined centrifuging processing for each of the sample including the resin-dispersed pigment and the sample including the self-dispersible black pigment;
    measuring viscosity before the centrifuging processing and viscosity after the centrifuging processing in each of the sample including the resin-dispersed pigment and the sample including the self-dispersible black pigment; and
    calculating a viscosity increasing rate of the viscosity after the centrifuging processing to the viscosity before the centrifuging processing in each of the sample including the resin-dispersed pigment and the sample including the self-dispersible black pigment.

16. An ink container which accommodates the water-based ink for ink-jet recording as defined in claim 1.

* * * * *